United States Patent
Tokikawa et al.

(10) Patent No.: US 8,599,543 B2
(45) Date of Patent: Dec. 3, 2013

(54) IMAGE DISPLAY APPARATUS INCLUDING CONNECTION STRUCTURE FOR CONNECTION WITH SUPPORTING BODY

(75) Inventors: Takuro Tokikawa, Ebina (JP); Kinya Kamiguchi, Kamakura (JP); Ryo Ohtomo, Chigasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 468 days.

(21) Appl. No.: 12/949,515

(22) Filed: Nov. 18, 2010

(65) Prior Publication Data

US 2011/0128685 A1 Jun. 2, 2011

(30) Foreign Application Priority Data

Nov. 27, 2009 (WO) .................. PCT/JP2009/069996

(51) Int. Cl.
*H05K 5/00* (2006.01)
*H05K 7/00* (2006.01)
*G06F 1/16* (2006.01)

(52) U.S. Cl.
USPC ............ 361/679.21; 361/679.01; 361/679.06; 361/679.22; 361/679.26; 248/917

(58) Field of Classification Search
USPC ............. 361/679.01, 679.06, 679.07, 679.21, 361/679.22, 679.26; 248/917
See application file for complete search history.

(56) References Cited

U.S. PATENT DOCUMENTS

| | | | | |
|---|---|---|---|---|
| 7,611,109 | B2 * | 11/2009 | Lin | 248/222.52 |
| 2004/0232298 | A1 * | 11/2004 | Bremmon et al. | 248/281.11 |
| 2005/0083465 | A1 | 4/2005 | Niiyama | |
| 2006/0291152 | A1 * | 12/2006 | Bremmon | 361/681 |
| 2008/0226846 | A1 * | 9/2008 | Hill | 428/13 |
| 2009/0225505 | A1 | 9/2009 | Kamiguchi | |
| 2010/0066936 | A1 * | 3/2010 | Garrett et al. | 349/58 |

FOREIGN PATENT DOCUMENTS

| | | |
|---|---|---|
| EP | 0884713 A2 | 12/1998 |
| EP | 0884713 A3 | 11/2001 |
| JP | 9-50241 A | 2/1997 |
| JP | 9-050247 A | 2/1997 |
| JP | 11-003041 A | 1/1999 |
| JP | 2000-293116 A | 10/2000 |
| JP | 2003-316274 A | 11/2003 |
| JP | 2006-058753 A | 3/2006 |
| JP | 2006-098735 A | 4/2006 |
| JP | 2009-216889 A | 9/2009 |

* cited by examiner

*Primary Examiner* — Anthony Haughton
(74) *Attorney, Agent, or Firm* — Canon USA Inc. IP Division

(57) ABSTRACT

A display panel including a support structure that can reduce deformation of the display panel, that provides high positioning performance, and that stably supports the display panel is provided. In addition, a support structure of an image display apparatus including the display panel is provided. A connecting mechanism includes a plurality of first connecting members fixed to a back surface of the display panel at the side opposite to an image display surface of the display panel, a plurality of second connecting members that connect the supporting body for supporting the display panel to the first connecting members, and a relative-position adjusting portion that adjusts relative positions between the first connecting members and the second connecting members. A flexural rigidity of the first connecting members is lower than a flexural rigidity of the display panel.

6 Claims, 9 Drawing Sheets

IMAGE DISPLAY APPARATUS INCLUDING CONNECTION STRUCTURE FOR CONNECTION WITH SUPPORTING BODY

FIELD OF THE INVENTION

The present invention relates to a display panel that is called a flat panel display (FPD) and a structure for connecting an image display apparatus including the display panel to a supporting body.

DESCRIPTION OF THE RELATED ART

Recently, thin image display apparatuses including FPDs, such as liquid crystal displays (LCD), plasma displays (PDP), field emission displays (FED), and organic EL displays (OLED) have been developed.

JAPANESE PATENT LAID-OPEN NO. 9-50241 discloses a structure illustrated in FIG. 9, which provides both a stable support for a display panel that warps and undulates and uniform heat radiation. In FIG. 9, a radiating member 504, which has a supporting function, and a display panel 501 are connected to each other by a plurality of supporting members A, each of which includes a heat conducting piece 502 and an elastic spring 503.

On the other hand, recently, there have been demands for thinner and lighter image display apparatuses. Accordingly, there have also been demands for thinner and lighter display panels to be installed in the image display apparatuses.

When the thickness and weight of an image display apparatus are reduced, the rigidity of a housing of the image display apparatus and the rigidity of a support frame that supports a display panel in the housing are reduced accordingly. Therefore, if an external force is applied to the image display apparatus, there is a risk that an undesirable deformation of the display panel will occur. The main component of the display panel is made of glass. Therefore, even when a stress generated by the deformation of the display panel is lower than or equal to a short-term breaking strength of the glass component of the display panel, there is a possibility that the display panel will break if the stress is applied for a long time. This possibility increases when warping of the display panel caused in the process of manufacturing the display panel, a dimensional tolerance of the support frame, an assembly tolerance, etc., are taken into account. The stress is preferably made as low as possible to ensure a long-term reliability.

However, according to the method disclosed in JAPANESE PATENT LAID-OPEN NO. 9-50241, a reaction force caused by the deformation of the elastic members is constantly applied to the display panel. Therefore, the stress is constantly generated in the display panel. For this reason, according to the method disclosed in JAPANESE PATENT LAID-OPEN NO. 9-50241, to stably support the display panel, the stress cannot be reduced beyond a certain limit. In addition, since the display panel is supported by the elastic members, there is a problem that the position of the display panel easily changes.

To solve the above-described problems, an object of the present invention is to provide a support structure for a display panel and an image display apparatus, the support structure having high positioning performance for positioning the display panel and being capable of stably supporting the display panel for a long time.

SUMMARY OF INVENTION

An image display apparatus according to an aspect of the present invention includes a display panel and a connecting mechanism for connecting the display panel to a supporting body that supports the display panel. The connecting mechanism includes a plurality of first connecting members fixed to a back surface of the display panel at the side opposite to an image display surface of the display panel, a plurality of second connecting members that connect the supporting body for supporting the display panel to the first connecting members, and a relative-position adjusting portion that adjusts relative positions between the first connecting members and the second connecting members. A flexural rigidity of the first connecting members is lower than a flexural rigidity of the display panel.

Further features of the present invention will become apparent from the following description of exemplary embodiments with reference to the attached drawings.

DESCRIPTION OF EMBODIMENTS

Embodiments of the present invention will now be described.

Figure 1A:
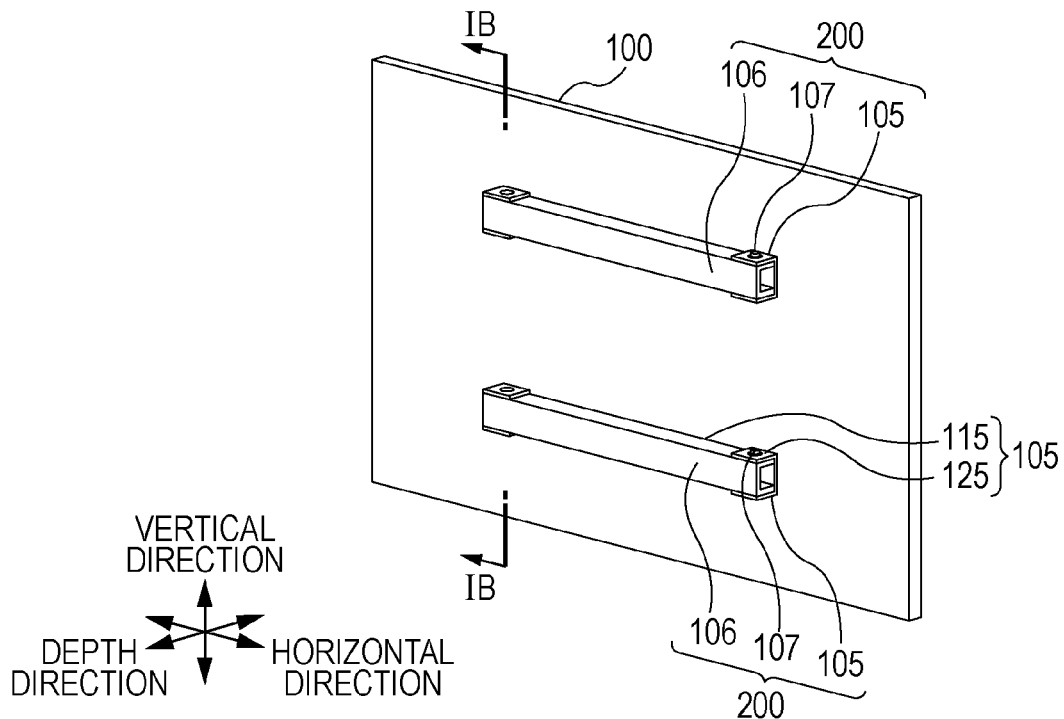
FIGS. 1A and 1B are schematic diagrams illustrating a first embodiment of an image display apparatus.
Figure 1B:
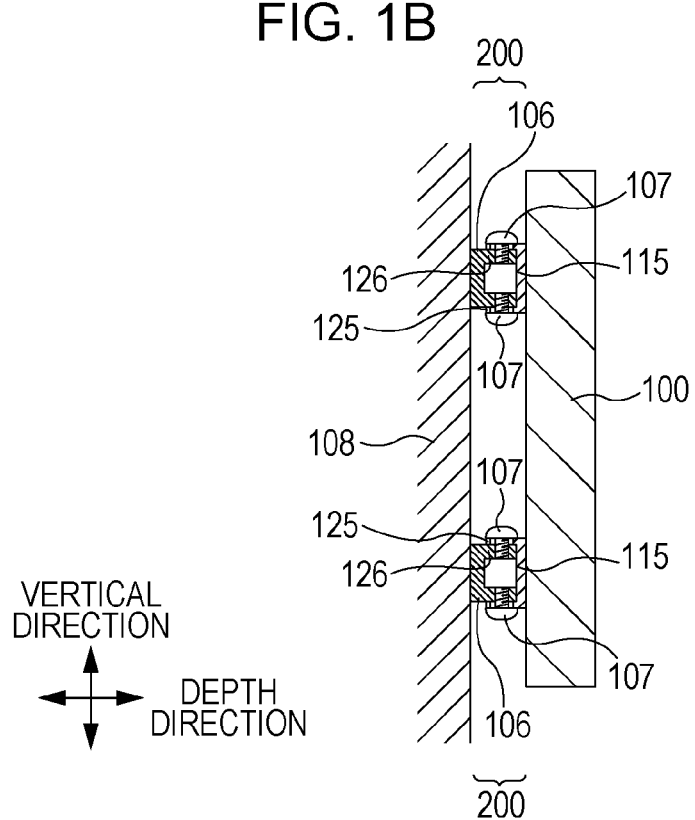

Referring to FIGS. 1A and 1B, in a supporting mechanism for an image display apparatus according to the present invention, a display panel 100 is connected to a supporting body 108 by connecting mechanisms 200. The supporting body 108 may be a wall, a support column (stand) used to mount the display panel 100 on the floor or a base, such as a cabinet, etc., depending on the manner in which the image display apparatus is installed. In other words, the supporting body 108 is a rigid body. The display panel includes a panel, such as an LCD, a PDP, an FED, and an OLED, which has an image display surface; fixing members (described in detail below) provided to fix the panel to the supporting body 108, such as a wall or a support column, at a back side (rear side) of the panel at the side opposite to the image display surface; and a driving circuit for driving the panel. Therefore, the display panel can be referred to as a display panel module. The image display apparatus includes the above-described display panel and at least the connecting mechanisms 200 that are connected to the above-described fixing members of the display panel. In addition, as necessary, the image display apparatus further includes a housing that accommodates the display panel, a receiver for receiving television signals, an image processing circuit that subjects received image signals to predetermined processes in accordance with the specifications of the display panel, and a speaker. In the case where, for example, the display panel 100 is placed on the floor or a base, such as a cabinet, the above-described support column can be considered as a part of the image display apparatus.

First, a first embodiment will be described with reference FIGS. 1A, 1B, and 2.

FIG. 1A is a perspective view of the display panel viewed from the rear. In a current display panel, an image display area is horizontally long (i.e., the dimension in a left-right direction (horizontal direction) is larger than the dimension in an up-down (vertical direction). Therefore, the display panel also has a shape that is long in the horizontal direction (rectangular shape). Accordingly, the image display surface (including the image display section) of the display panel is also rectangular (horizontally long), and the outline of the display panel includes long sides (horizontally extending sides) and short sides (vertically extending sides). Referring to FIGS. 1A and 1B, electrical circuit boards for driving the display panel are generally provided at the rear side (side opposite to the image display surface) of the display panel. However, for convenience of explanation, the electrical circuit boards are not shown in the figure. FIG. 1B is a schematic sectional view of the image display apparatus including the cross section of FIG. 1A taken along one-dot chain line IB-IB. FIG. 1B illustrates the state in which the display panel 100 is fixed to the supporting body 108.

In the embodiment illustrated in FIGS. 1A and 1B, the connecting mechanisms 200, which are disposed between the display panel 100 and the supporting body 108, extend along the horizontal direction (longitudinal direction) of the display panel 100. Therefore, in a simplified structure, the connecting mechanisms 200 extend along the longitudinal direction (left-right direction) of the display panel. Since the image display surface of the display panel is rectangular (horizontally long), the connecting mechanisms 200 extend in the left-right direction of the image display surface of the display panel.

In addition, as described below, a plurality of plate-shaped spacers are provided in a display panel of an FED such that the longitudinal directions of the spacers extend along (are parallel with) the longitudinal direction (horizontal direction) of the display panel. Therefore, in the embodiment illustrated in FIGS. 1A and 1B, the connecting mechanisms 200 are provided so as to extend along the longitudinal direction of the spacers. The supporting body 108 is, for example, a support column (stand), a wall, or a wall hanger, and has a rigidity that is sufficiently higher than that of the display panel.

The connecting mechanisms 200 include first connecting members 105, second connecting members 106, and relative-position adjusting portions 107 that adjust the relative positions between the first connecting members 105 and the second connecting members 106. In the present embodiment, two first connecting members 105 and two second connecting members 106 are provided (two pairs of first and second connecting members 105 and 106 are provided). However, the numbers of the first connecting members 105 and the second connecting members 106 are not particularly limited.

As described in detail below, it can also be said that parts of the first connecting members 105 and parts of the second connecting members 106 serve the function of the relative-position adjusting portions 107. Therefore, it can also be said that the connecting mechanisms 200 include the first connecting members 105 and the second connecting members 106, and the first connecting members 105 and the second connecting members 106 are provided with the relative-position adjusting portions 107. Alternatively, it can also be said that the connecting mechanisms 200 include the first connecting members 105 and the second connecting members 106, and each of the first connecting members 105 and the second connecting members 106 includes the relative-position adjusting portions 107.

Each first connecting member 105 includes a flat plate portion 115 that is fixed to the rear surface of the display panel 100 and bent portions 125 that serve a part of the function of the relative-position adjusting portions 107 that adjust the relative position between the first connecting member 105 and the corresponding second connecting member 106. The bent portions 125 may be formed by bending portions of components that are formed integrally with the flat plate portion 115, or be attached to the flat plate portion 115 by welding. The bent portions 125 may also be called projecting portions that project in a direction away from the rear surface of the display panel 100. Alternatively, the bent portions 125 may be called projecting portions that project toward the second connecting member 106.

The flat plate portion 115 may be directly fixed to the rear surface of the display panel 100. However, the flat plate portion 115 is preferably fixed with a screw or the like to a fixing member 104 (described in detail below) that is fixed to the rear surface of the display panel 100.

To reduce deformation of the display panel 100 in a depth direction (see FIGS. 1A, 1B, and 2) caused when the first connecting members 105 are fixed to the display panel 100, the shape and material of the first connecting members 105 are set such that the flexural rigidity thereof is lower than the flexural rigidity of the display panel 100. The flexural rigidity is an index used when a deformation of a beam is considered, and is calculated as the product EI [N·mm$^2$] of the Young's modulus E [N/mm$^2$] of the material of the beam and the second moment of inertia I [mm$^4$] of the component that forms the beam.

In the case where the flexural rigidity cannot be obtained by calculation, it is assumed that the component for which the flexural rigidity is to be obtained (the display panel, the connecting members 105 and 106, etc.) is a beam. More specifically, the relationship between the load W applied to the component for which the flexural rigidity is to be obtained and the deflection v of the component is determined by experiments or a common structural analysis using, for example, a finite element method. Then, the flexural rigidity of the component is obtained by using an expression of deformation of the beam. For example, in the case where a beam (the display panel, the connecting members 105 and 106, etc.) having a length l is fixed at one end and is free at the other end and load W is applied to the beam, the expression of deformation that shows the deflection v of the beam at the free end can be obtained as $v=Wl^3/3EI$ using the load W, the length l, and the flexural rigidity EI. Therefore, the flexural rigidity EI can be calculated from the load W, the deflection v, and the length l of the beam.

In the embodiment illustrated in FIGS. 1A and 1B, portions of each first connecting member 105 including the bent portions 125 are angular U-shaped in a cross section taken along a plane perpendicular to the longitudinal direction (horizontal direction) of the first connecting member 105. The remaining portion of the first connecting member 105 is flat plate shaped and has a thickness of about 1 mm. Since only the portions of each first connecting member 105 including the bent portions 125 are angular U-shaped in cross section (the remaining portion is flat plate shaped), the flexural rigidity of the first connecting member 105 is lower than the flexural rigidity of the display panel 100. The first connecting members 105 are generally formed of a metal or an alloy. The portions of each first connecting member 105 including the bent portions 125 may instead be, for example, L-shaped in cross section.

Causes of deformation of the display panel 100 that occurs when the first connecting members 105 are fixed to the display panel 100 are, for example, warping of the panel caused in the process of manufacturing the display panel 100, dimensional tolerance, assembly tolerance, and differences in flatness between the first connecting members 105. However, since the flexural rigidity of the first connecting members 105 is lower than that of the display panel 100, the deformation due to the above-described causes can be adjusted (absorbed) by the deformation of the first connecting members 105. As a result, deformation of the display panel 100 in the depth direction (see FIGS. 1A and 1B) may be reduced.

The second connecting members 106 include fixing portions for fixing the first connecting members 105 to the supporting body 108 with screws or the like with the second connecting members 106 interposed therebetween. The second connecting members 106 serve a part of the function of the relative-position adjusting portions 107 that adjust the relative positions between the second connecting members 106 and the first connecting members 105. To provide sufficient strength for stably supporting the image display apparatus, the material and shape of the second connecting members 106 are appropriately determined in accordance with the type, size, weight, etc., of the display panel 100. In practice, the flexural rigidity of the second connecting members 106 is higher than the flexural rigidity of the first connecting members 105, and is also higher than the flexural rigidity of the display panel 100. In the embodiment illustrated in FIGS. 1A and 1B, to ensure the strength, the cross section of each second connecting member is uniformly angular U-shaped in the longitudinal direction. More specifically, each second connecting member 106 includes a flat plate portion 116 and bent portions 126. The bent portions 126 may be formed by bending portions of components that are formed integrally with the flat plate portion 116, or be attached to the flat plate portion 116 by welding. The bent portions 126 may be called projecting portions that project toward the display panel 100. Alternatively, the bent portions 126 may be called projecting portions that project toward the first connecting member 105.

In addition, so-called square-bar shaped components (components having cross sections that are uniformly rectangular in the longitudinal direction of the second connecting members) may be used as the second connecting members 106, so as to ensure strength and serve a part of the function of the adjusting portions 107. However, in such a case, there is a risk that the weight will be increased. Therefore, preferably, the cross section of each second connecting member is uniformly angular U-shaped in the longitudinal direction.

Figure 2:
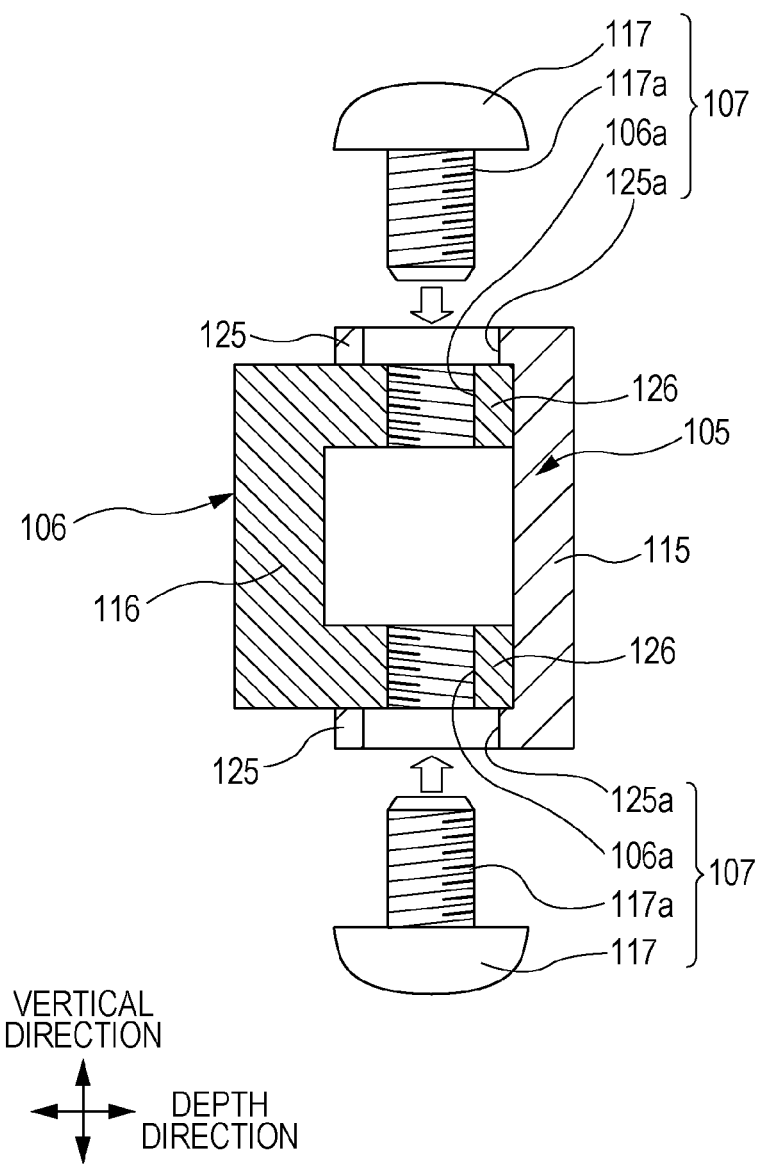
FIG. 2 is a schematic diagram illustrating a first embodiment of adjusting portions.

FIG. 2 is an enlarged view of the adjusting portion 107 illustrated in FIG. 1B. In the embodiment illustrated in FIG. 2, each adjusting portion 107 includes a long circular hole (elliptical opening) 125a formed in the first connecting member 105, a screw 117, and an internal thread portion 106a formed in the second connecting member 106. The screw diameter of the screws 117 is set such that the screws 117 can be screwed into the internal thread portions 106a.

The screws 117 are inserted through the long circular holes 125a and are screwed into the internal thread portions 106a while the first connecting member 105 and the second connecting member 106 are fitted together (while at least parts of the bent portions 125 overlap at least parts of the bent portions 126). In this state, the flat plate portion 115 of the first connecting member 105 and the flat plate portion 116 of the second connecting member 106 face each other.

Figure 9:
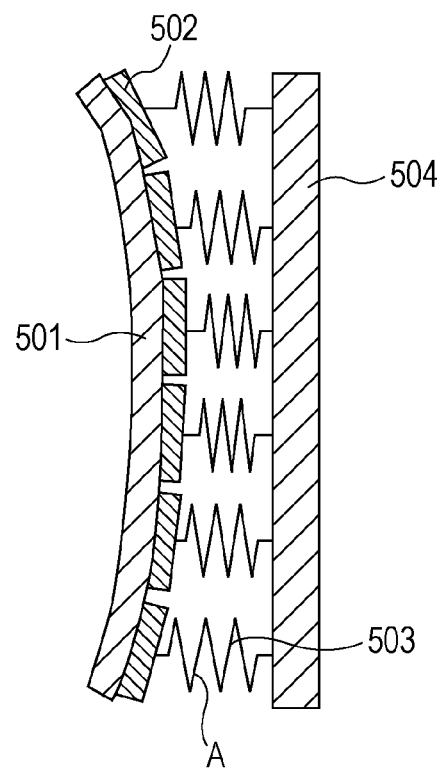
FIG. 9 is a schematic diagram illustrating an example of the structure of an image display apparatus according to a related art.

More specifically, in this embodiment, the first connecting member 105 and the second connecting member 106 are screw-fastened to each other. However, the adjusting portions 107 according to this embodiment are merely an example, and the adjusting portions are not limited to this embodiment. The major axis and/or the minor axis of the long circular holes 125a correspond to the adjustable range of the relative position between the first connecting member 105 and the second connecting member 106. Although the long circular holes 125a are formed in the first connecting member 105 and the internal thread portions 106a are formed in the second connecting member 106 in the embodiment illustrated in FIG. 2, the relationship may be vice versa. The internal thread portions 106a may be formed by tapping or installing helical inserts. Alternatively, spacer-shaped components having internal thread portions may be pressed-fitted to the second connecting member 106. The relative position between the first connecting member 105 and the second connecting member 106 in the depth direction can be adjusted by the above-described adjusting portions 107. Therefore, the deformation of the display panel 100 in the depth direction caused by uneven flatness of the supporting body 108 when the display panel 100 is fixed to the supporting body 108 can be reduced. As described above, according to the structure of the present invention, the reaction force applied to the display panel can be reduced compared to that in the support structure including the springs according to the related art illustrated in FIG. 9. In addition, variation in the position of the display panel can also be reduced compared to the structure of the related art. Therefore, the display panel can be stably supported for a long time.

Figure 3A:
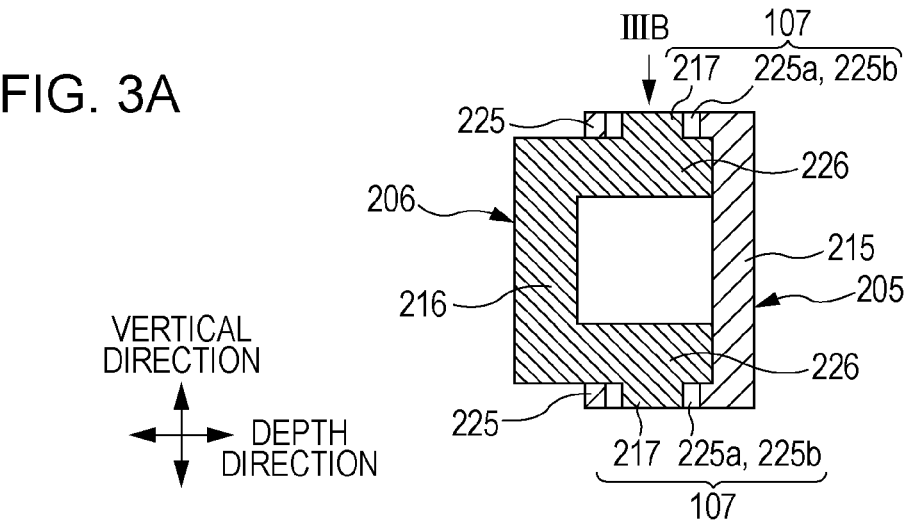
FIGS. 3A to 3C are schematic diagrams illustrating a second embodiment of adjusting portions.
Figure 3B:
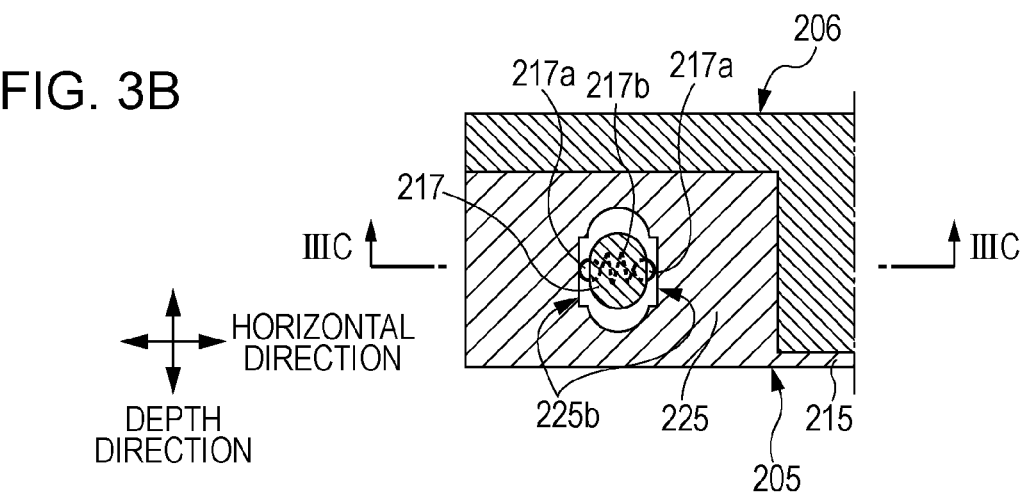
Figure 3C:
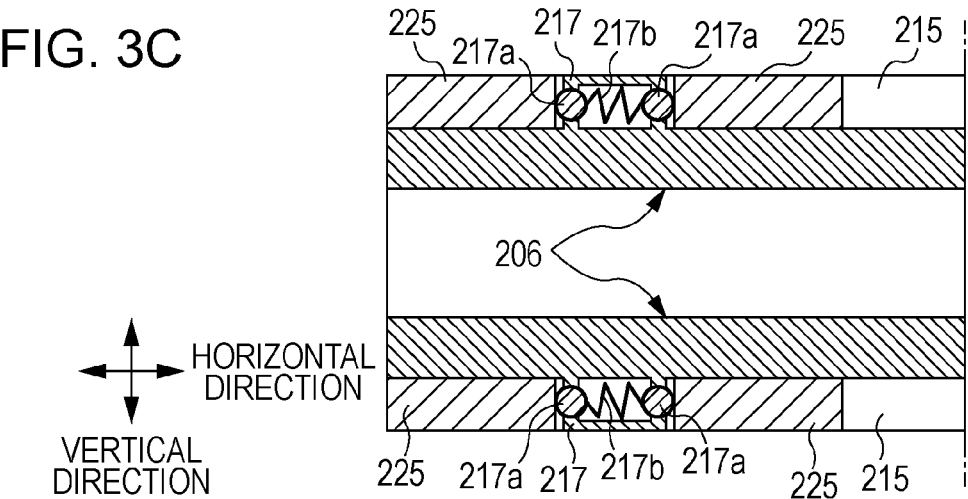

FIGS. 3A, 3B, and 3C illustrate a second embodiment of the adjusting portions 107. According to this embodiment, each adjusting portion 107 has a so-called slider structure for adjusting the relative position. Other structures of the present embodiment are similar to those in the first embodiment. FIG. 3A is an enlarged sectional view corresponding to the sectional view illustrated in FIG. 2, and FIG. 3B is a view on arrow 111B shown in FIG. 3A. FIG. 3C is a schematic sectional view of FIG. 3B taken along line IIIC-IIIC. In the embodiment illustrated in FIGS. 1A, 1B, and 2, the internal thread portions 106a are provided in the bent portions 126 of each second connecting member 106. In the present embodiment, slider portions 217 are provided on bent portions 226 of a second connecting member 106.

In the present embodiment, the adjusting portions 107 includes the slider portions 217 (which each have balls 217a and a spring 217b) provided on the second connecting member 206 and portions (rail portions) 225b of inner walls of openings 225a formed in bent portions 225 of a first connecting member 205. Thus, the openings 225a, which serve a part (rail portion) of the function of the adjusting portions 107, are formed in the bent portions 225 of the first connecting member 205. In addition, the slider portions 217 are provided on the bent portions 226 of the second connecting member 206.

Similar to the first embodiment, the first connecting member 205 includes a flat plate portion 215 that is fixed to the rear surface of the display panel 100 and the bent portions 225. Similar to the first embodiment, the bent portions 225 may be formed by bending or bonded to the flat plate portion 215. Preferably, the bent portions 225 are formed by bending parts of the flat plate portion 215.

In this embodiment, the balls 217a are pushed against the rail portions 225b by the springs 217b, so that the relative position between the first connecting member 205 and the second connecting member 206 is fixed by the frictional force generated between the balls 217a and the rail portions 225b. The balls 217a are formed of steel balls. The steel balls may be formed of a metal or an alloy. For example, balls generally used in bearings may be used as the steel balls. The rail portions 225b are provided to guide or limit the movement of the steel balls 217a. When the relative position is to be further adjusted in the depth direction, the slider portions 217 are moved along the rails 225b by applying a force larger than the frictional force in the depth direction.

Figure 4A:
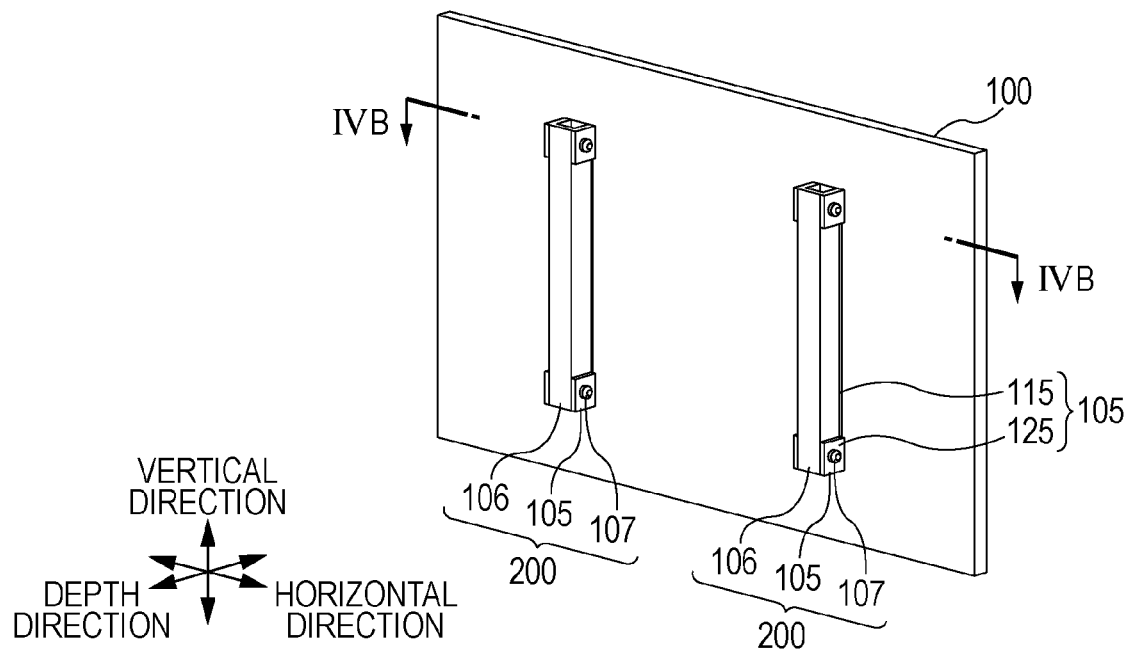
FIGS. 4A and 4B are schematic diagrams illustrating a third embodiment of connecting mechanisms.
Figure 4B:
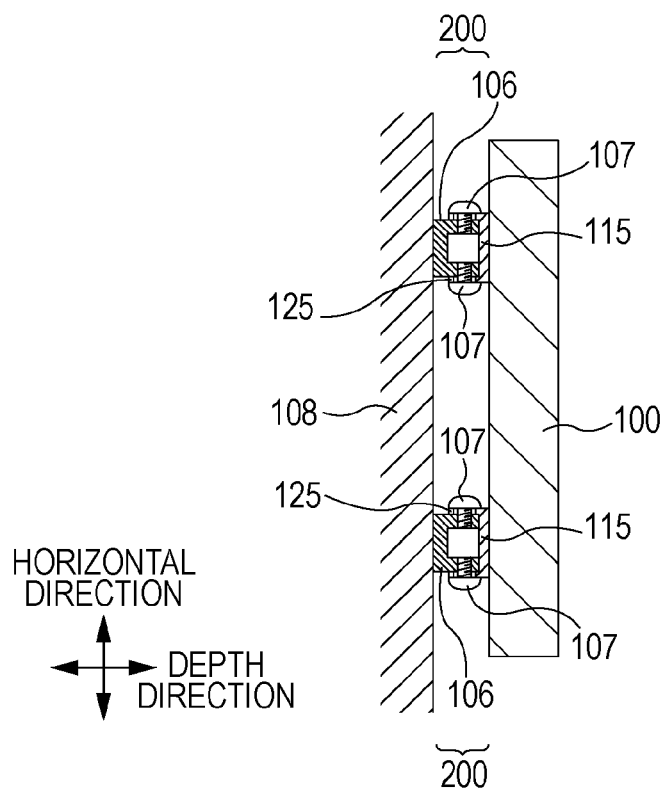

FIGS. 4A and 4B illustrates a third embodiment of the connecting mechanisms 200. In this embodiment, the connecting mechanisms 200 have the same shape as those in FIGS. 1A and 1B, but are arranged so as to extend in the vertical direction of the display panel 100. Therefore, in the present embodiment, each connecting mechanism 200 is arranged such that the longitudinal direction thereof is perpendicular to the longitudinal direction of the plate-shaped spacers in the FED. Although the adjusting portions 107 having the fastening structure using screws similar to those in FIG. 2 are illustrated, the adjusting portions having the slider structure as illustrated in FIGS. 3A to 3C may instead be used. FIG. 4B is a schematic sectional view of an image display apparatus including the cross section of FIG. 4A taken along one-dot chain line IVB-IVB.

Figure 5A:
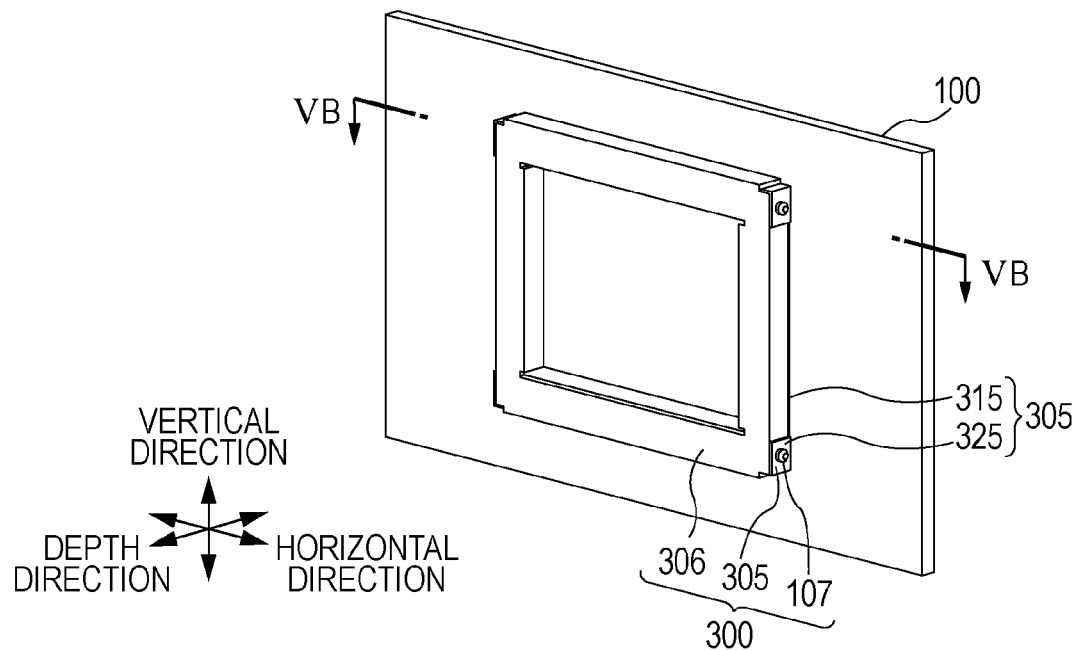
FIGS. 5A and 5B are schematic diagrams illustrating a fourth embodiment of a connecting mechanism.
Figure 5B:
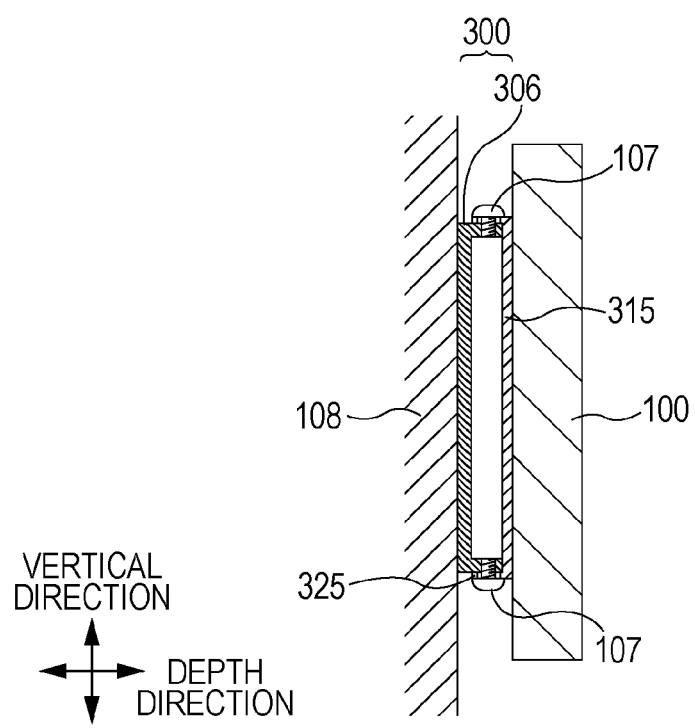

FIGS. 5A and 5B illustrates a connecting mechanism 300 according to a fourth embodiment. In this embodiment, the connecting mechanism 300 has a structure similar to that in FIGS. 1A and 1B except the connecting mechanism 300 has a rectangular shape (angular-O shape). Similar to the above-described other embodiments, a first connecting member 305 includes a flat plate portion 315 and bent portions 325 that are provided with adjusting portions 107. In addition, a second connecting member 306 includes a fixing portion that is fixed with screws or the like to the supporting body 108, and is provided with the adjusting portions 107 that adjust the relative position between the first connecting member 305 and the second connecting member 306. The adjusting portions 107 are provided with screws, similar to the embodiments illustrated in FIGS. 1A, 1B, 2, 4A, and 4B. However, the adjusting portions having the slider structure as illustrated in FIGS. 3A to 3C may instead be used. FIG. 5B is a schematic sectional view of an image display apparatus including the cross section of FIG. 5A taken along one-dot chain line VB-VB.

An example of the present invention will now be described.

Figure 6:
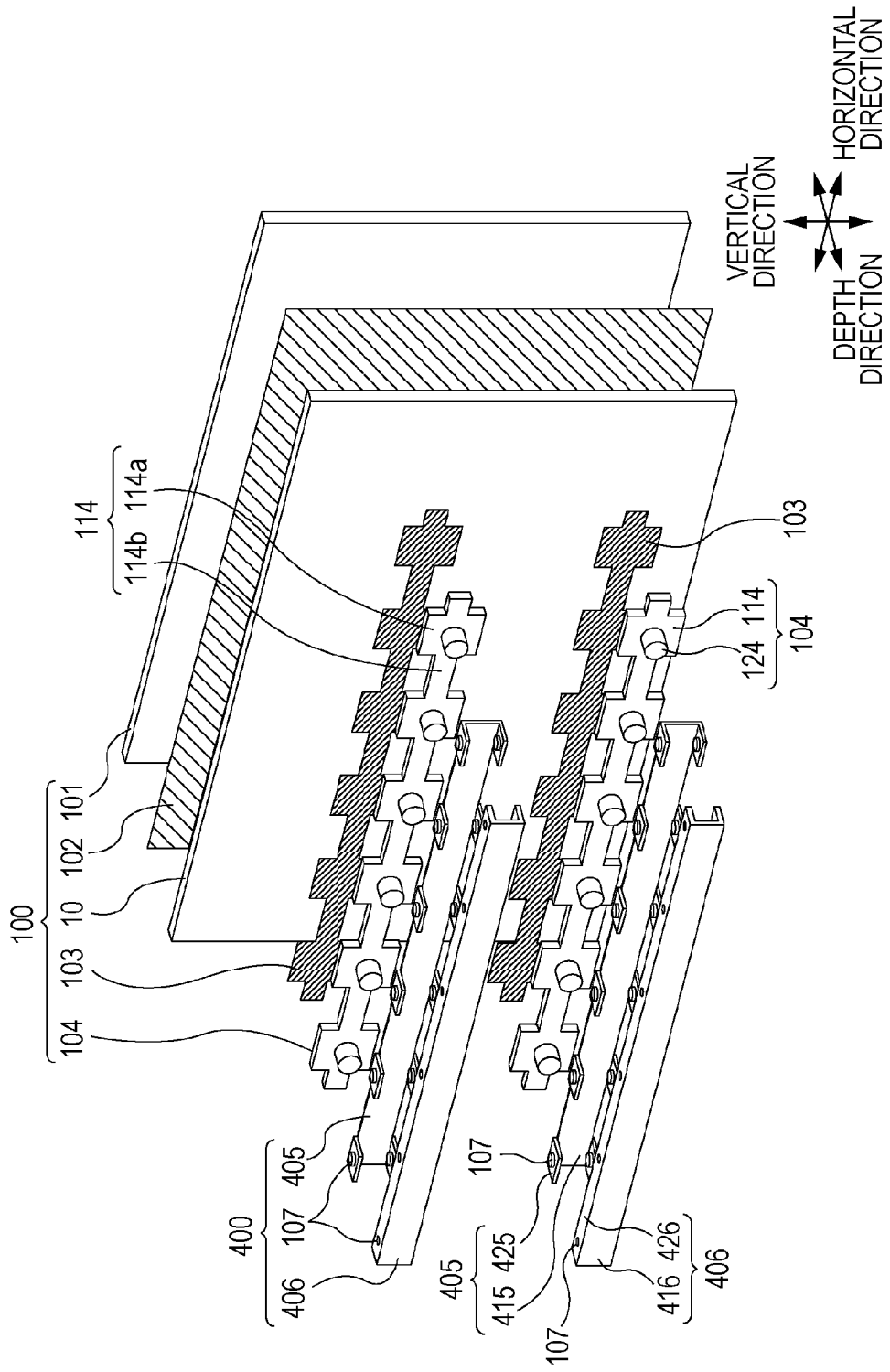
FIG. 6 is an exploded schematic view of an image display apparatus.
Figure 7A:
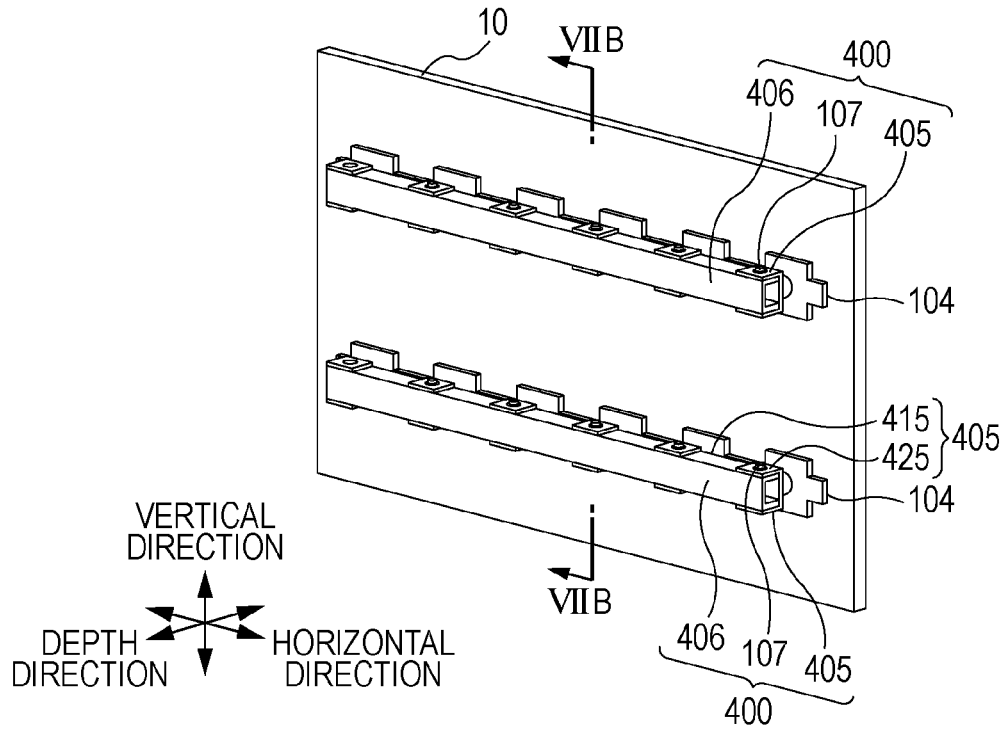
FIGS. 7A and 7B are schematic diagrams illustrating the structure of the image display apparatus.
Figure 7B:
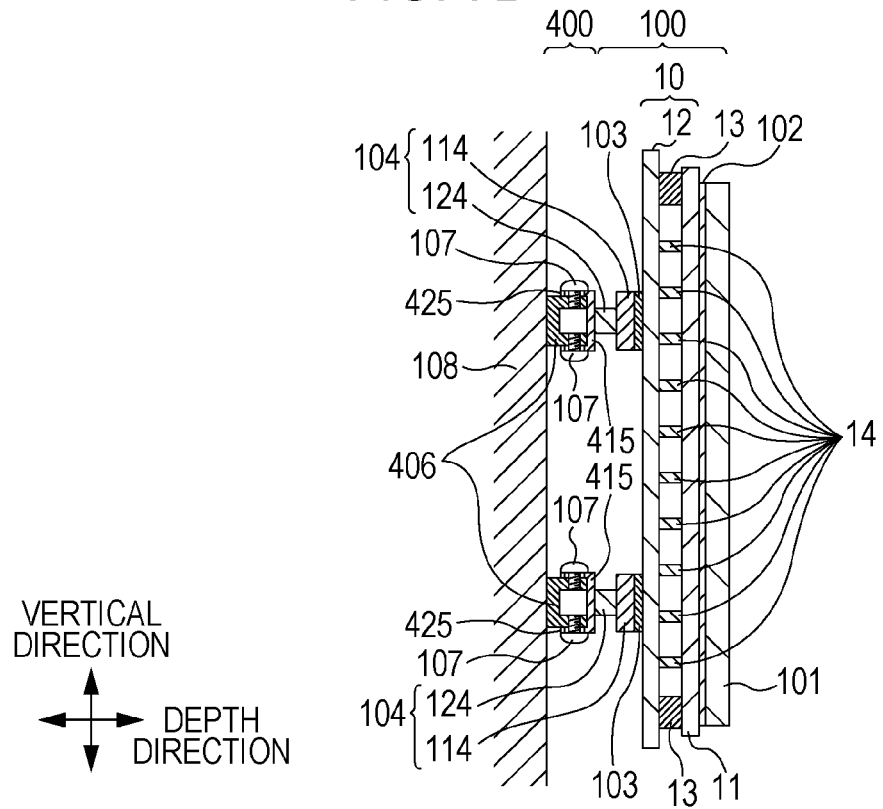

FIG. 6 is an exploded view of a display panel including connecting mechanisms according to the example. FIG. 7A is a perspective view of the display panel. FIG. 7B is s schematic sectional view of an image display apparatus including the cross section of FIG. 7A taken along one-dot chain line VIIB-VIIB.

Here, an example in which the image display apparatus is a field emission display (FED) will be described. In this example, a display panel 100 includes at least a vacuum vessel 10 having an image display surface, a front plate 101 that is bonded to the image display surface of the vacuum vessel 10 with an adhesive member 102, and fixing members 104 provided on a surface (back surface) of the vacuum vessel 10 at the side opposite to the side at which the front plate is provided. In this example, the fixing members 104, which will be described in detail below, are line-shaped and are bonded to the back surface of the vacuum vessel 10 with adhesive members 103. Connecting mechanisms 400 including first connecting members 405, second connecting members 406, and relative-position adjusting portions 107 are provided between the supporting body 108 and the fixing members 104.

Figure 8A:
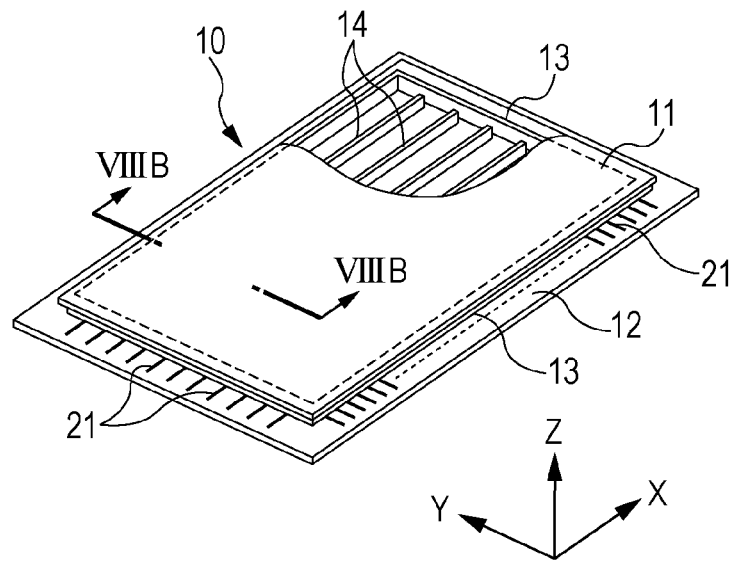
FIGS. 8A to 8C are schematic diagrams illustrating a display panel.
Figure 8B:
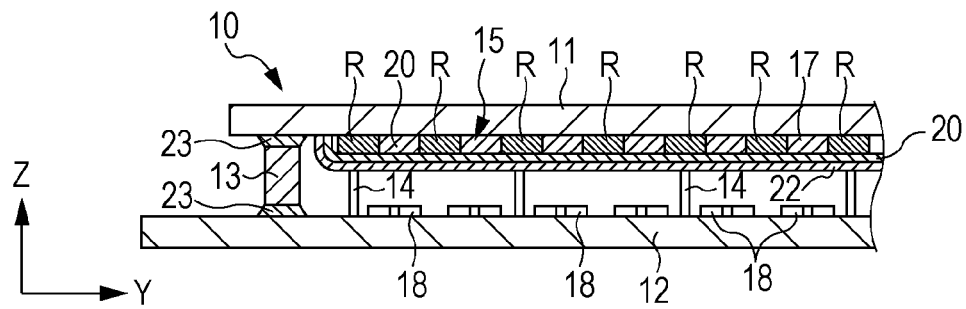
Figure 8C:
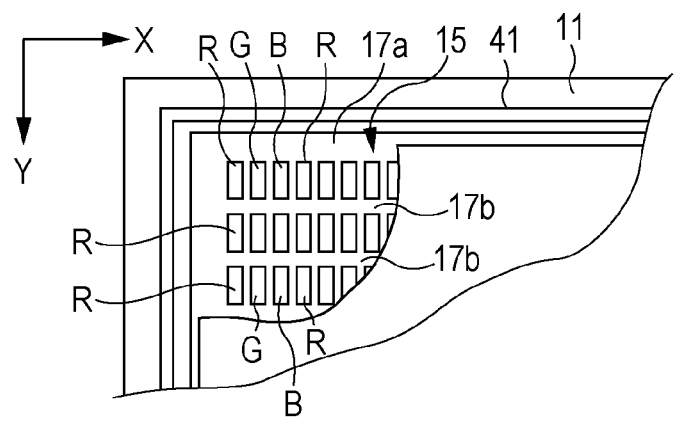

The vacuum vessel 10 will now be described with reference FIGS. 8A to 8C. FIG. 8A is a partially broken schematic perspective view of the vacuum vessel 10, and FIG. 8B is a schematic sectional view of FIG. 8A taken along line VIIIB-VIIIB. FIG. 8C is a schematic diagram illustrating a part of a front substrate 11 viewed in a direction from a rear substrate 12. The above-described vacuum vessel 10 may be, for example, an FED. As illustrated in FIG. 8A, the vacuum vessel 10 includes the front substrate 11 and the rear substrate 12, which are formed of rectangular glass substrates. These substrates are arranged so as to face each other with a gap of 1 to 2 mm provided therebetween. The thicknesses of the front substrate 11 and the rear substrate 12 are in the range of 0.5 mm to 3 mm, and are preferably smaller than or equal to 2 mm. Peripheral portions of the front substrate 11 and the rear substrate 12 are bonded together with a rectangular frame-shaped side wall 13 interposed therebetween, and the space between the front substrate 11 and the rear substrate 12 is maintained at a high vacuum state with a pressure of about $10^{-4}$ Pa or less. Thus, the vacuum vessel 10 has a flat rectangular shape. The gap (space) between the front substrate 11 and the rear substrate 12 is set to a predetermined interval. The interval may be, for example, in the range of 200 μm to 3 mm, more practically, in the range of 1 mm to 2 mm. The side wall 13 may be formed of, for example, glass or metal. In addition, an adhesive having a sealing function, such as low-melting glass or low-melting metal, is used as adhesive members 23. The adhesive members 23 are used to bond the front substrate 11 and the rear substrate 12 to the side wall 13, so that the peripheral portions of the front substrate 11 and the rear substrate 12 are sealed (air-tightly bonded). In this example, a bonding member for bonding the front substrate 11 and the rear substrate 12 to each other include the side wall 13 and the adhesive members 23. However, the side wall 13 may be omitted depending on the interval to be set between the front substrate 11 and the rear substrate 12. More specifically, the structure of the bonding member is not limited as long as the space between the front substrate 11 and the rear substrate 12 can be surrounded and air-tightly sealed by the bonding member and the front substrate 11 and the rear substrate 12 can be bonded together.

As illustrated in FIG. 8B, an illuminating element layer 15 made of, for example, a fluorescent material, is provided on an inner surface of the front substrate 11. The illuminating element layer 15 includes illuminating elements R, G, and B that respectively emit red, green, and blue light and a matrix-shaped light-blocking member 17. A metal back layer 20 that is formed mainly of aluminum and that functions as an anode is formed on the illuminating element layer 15. In addition, a getter film 22 may be formed on the metal back layer 20. A predetermined anode voltage is applied to the metal back layer 20 in a display operation.

Multiple electron-emitting elements 18 that emit electron beams are arranged on a surface (inner surface) of the rear substrate 12 that faces the front substrate 11. The electron-emitting elements 18 function as electron sources that excite the illuminating elements R, G, and B included in the illuminating element layer 15. The electron-emitting elements 18 are arranged in a matrix pattern in accordance with pixels (illuminating elements R, G, and B). The electron-emitting elements 18 may be, for example, surface-conduction electron-emitters or field-emission electron-emitters. Multiple wires 21 for driving the electron-emitting elements 18 are provided in a matrix pattern on the inner surface of the rear substrate 12, and ends of the wires 21 extend to the outside of the vacuum vessel 10.

Multiple elongate plate-shaped spacers 14 are arranged between the rear substrate 12 and the front substrate 11 to bear the atmospheric pressure applied to the substrates. When the longitudinal direction (long-side direction) of the front substrate 11 and the rear substrate 12 is defined as the first direction X and a direction perpendicular to the first direction X (width direction or short-side direction) is defined as the second direction Y, the spacers 14 extend in the first direction X. The spacers 14 are arranged in the second direction Y with intervals therebetween. The intervals between the spacers 14 in the second direction Y may be, for example, in the range of 1 mm to 50 mm. The spacers 14 may be formed of an elongate glass plate or ceramic plate. In addition, high-resistance films or irregular surfaces may be provided on the surfaces of the above-described plates as necessary. The height (dimension in the Z direction) of the spacers 14 is several times to ten or more times as large as the width (dimension in the second direction Y) of the spacers 14. In addition, the length (dimension in the first direction X) of the spacers 14 is larger than the height thereof by a factor of several tens to several hundreds. In the state in which the image display apparatus is used, the first direction X corresponds to the horizontal direction in FIGS. 1A, 1B, and other figures and the second direction Y corresponds to the vertical direction in FIGS. 1A, 1B, and other figures.

In the display panel and the image display apparatus including the above-described vacuum vessel, to display an image, the anode voltage is applied to the illuminating element layers R, G, and B through the metal back layer 20. In addition, at the same time, the electron beams emitted by the electron-emitting elements 18 are accelerated by the anode voltage and are caused to collide with the illuminating elements. Accordingly, the illuminating elements R, G, and B are activated and illuminate, so that a color image is displayed.

As illustrated in FIG. 8C, the illuminating element layer 15 includes multiple rectangular illuminating elements R, G, and B that respectively emit red, green, and blue light. The illuminating elements R, G, and B are periodically arranged with predetermined gaps therebetween in the first direction X, and the illuminating elements of the same color are arranged with predetermined gaps therebetween in the second direction. The gaps in the first direction X are smaller than the gaps in the second direction Y. The light-blocking layer 17 includes a rectangular frame-shaped portion 17a that extends along the periphery of the front substrate 11 and a matrix portion 17b that is formed in a matrix pattern so as to extend between the illuminating element layers R, G, and B in an area inside the rectangular frame-shaped portion.

In this example, the size of the image display area of the vacuum vessel 10 is 55 inches in diagonal. In addition, surface-conduction electron-emitters are used as the electron-emitting elements 18. The electron-emitting elements 18 are connected to both scanning lines and signal lines which are formed by baking a conductive paste containing silver particles. The thickness of each of the front substrate 11 and the rear substrate 12 is 1.8 mm, and the interval between the front substrate 11 and the rear substrate 12 is 1.6 mm.

The flat rectangular vacuum vessel 10 is sealed in a vacuum environment, and the pressure in the vacuum vessel 10 is maintained at $1.0 \times 10^{-5}$ Pa. The side wall 13 is formed of glass, and the adhesive members 23 are formed of indium. The front substrate 11 and the rear substrate 12 are bonded together in a vacuum chamber while locally heating the bonding member and pressing the rear substrate 12 against the front substrate 11. The longitudinal direction of the elongate plate-shaped spacers 14 is the same as the longitudinal direction ("first direction X" or "horizontal direction") of the flat rectangular vacuum vessel 10. The elongate plate-shaped spacers 14 are arranged in a direction perpendicular to the longitudinal direction of the vacuum vessel 10 ("second direction Y" or "vertical direction") with intervals of 15 mm therebetween. The spacers 14 are formed of glass, and the thickness thereof is 200 μm. The spacers 14 are arranged on the scanning lines, and are fixed to the rear substrate 12 at both ends thereof in the longitudinal direction by Aron Ceramic D (produced by Toagosei Co., Ltd.), which is an inorganic adhesive. In addition, the front plate 101, the vacuum vessel 10, and the plate-shaped spacers 14 are arranged such that longitudinal directions thereof are parallel to each other.

Next, the front plate 101 will be described. The front plate 101 is formed of a flat plate shaped component that transmits visible light. For example, a glass plate or a polycarbonate plate may be used as the front plate 101. However, a glass plate is particularly preferable from the viewpoint of optical characteristics. In the present example, the thickness of the front plate 101 is 2.5 mm. The material, shape, thickness, area, etc., of the adhesive member 102 for bonding the front plate 101 to the vacuum vessel 10 are appropriately set in consideration of, for example, the strength, shock absorption, and thermal conductivity of the adhesive member 102, and flatness of the front plate. Since the front plate 101 is bonded to the vacuum vessel 10 after the vacuum vessel 10 is formed, it is preferable to use an adhesive that does not require a high-temperature heating process. For example, an ultraviolet curing resin adhesive can be used with which the vacuum vessel 10 made of glass and the front plate 101 made of glass can be bonded together by irradiation with ultraviolet rays at a normal temperature. More specifically, acrylic ultraviolet curing resin adhesive may be used. In this example, TB3042C (produced by ThreeBond Co., Ltd.) is used, and the thickness of the adhesive is 0.5 mm. As described above, since the front plate 101 is bonded to the vacuum vessel 10 using the adhesive member 102, the rigidity, in particular, the torsional rigidity in the planar direction of the vacuum vessel 10 is increased. Therefore, although a reinforcing member, such as a reinforcing frame, must be provided on the back surface of the rear substrate 12 in the structure of the related art, the reinforcing member can be replaced by components such as the fixing members 104 whose thickness and weight can be largely reduced. In addition, the combination of the front plate 101 and the adhesive member 102 is also advantageous in that reflection or glare of external light at the image display unit can be reduced.

Next, the fixing members 104 will be described with reference FIGS. 6 and 7. FIG. 6 is an exploded view of the display panel viewed from the rear. FIG. 7A is a perspective view of the display panel viewed from the rear. FIG. 7B is a schematic sectional view of the image display apparatus including the cross section of FIG. 7A taken along one-dot chain line VIIB-VIIB. In the image display apparatus, the display panel illustrated in FIG. 7A is attached to the supporting body 108 with the connecting mechanisms 400 interposed therebetween. The supporting body 108 may be a wall or a support column included in the image display apparatus. In practice, the image display apparatus is generally provided with a cover (not shown), such as an external panel, in addition to the structure shown in FIGS. 7A and 7B to improve the appearance. The one-dot chain line VIIB-VIIB corresponds to the center line of the image display area (or the rear substrate 12) of the display panel (vacuum vessel 10) along the vertical direction (second direction Y in FIG. 8A.

Each of the fixing members 104 is a line-shaped member including a plate-shaped member 114 and a plurality of projecting members 124. The plate-shaped member 114 includes a plurality of large-width portions 114a and a plurality of small-width portions 114b that are alternately arranged. The projecting members 124 are provided on the large-width portions. The fixing members 104 are bonded to the back surface of the rear substrate 12 (surface opposite to the surface (inner surface) that faces the front substrate 11) with the adhesive members 103. Thus, the fixing members 104 are strongly bonded (fixed) to the back surface of the vacuum vessel 10. Therefore, the vacuum vessel 10 can be supported by the supporting body 108 with the fixing members 104 and the connecting mechanisms 400 provided therebetween. There is a risk that the vacuum vessel 10 will be deformed due to, for example, the dimensional tolerance of the fixing members 104, the assembly tolerance in the process of attaching the fixing members 104 to the vacuum vessel 10 with the adhesive members 103, or uneven flatness of the supporting body 108. However, since the display panel 100 is fixed to the supporting body 108 with the first connecting members 405 interposed therebetween, the deformation of the vacuum vessel 10 can be reduced.

With regard to the shape of the plate-shaped members 114, vertical and horizontal dimensions of the large-width portions 114a are 60 mm and 60 mm, respectively, and vertical and horizontal dimensions of the small-width portions 114b are 10 mm and 140 mm, respectively. The thickness of the plate-shaped members 114 is 2 mm. Although the thickness is set to 2 mm in this example, in practice, the thickness is preferably set in the range of 1 mm or more and less than 30 mm, and more preferably, 10 mm or less, in the case where the material of the plate-shaped members 114 is metal or alloy. The plate-shaped members 114 are formed by press working using a zinc coated steel plate as the material.

Internal threads used to attach the display panel 100 to the supporting body 108 with the connecting mechanisms 400 provided therebetween are formed in the projecting members 124. In the present example, the internal threads are formed by header processing. The projecting members 124 are fixed to the plate-shaped members 114 by forming knurls and grooves in portions of the projecting members 124 that come into contact with the plate-shaped members 114 and performing press-caulking from the rear side. Thus, a single projecting member 124 is fixed to each of the large-width portions of the plate-shaped members 114 at the central position thereof. The height of the apex portions (portions farthest from the back surface of the rear substrate 12) of the projecting members 124 from the back surface of the rear substrate 12 is 25 mm. In practice, in consideration of the arrangement of the circuit board, the height of the projecting members 124 from the back surface of the rear substrate 12 may be set in the range of 5 mm or more and less than 30 mm. Stainless steel is used as the material of the projecting members 124. In the present example, the horizontal pitch of the projecting members 124 (supporting points) is 200 mm, and the two line-shaped fixing members 104 are arranged with a vertical interval of 400 mm therebetween such that the longitudinal direction of each fixing member 104 extends along the horizontal direction (along the longitudinal direction of the spacers).

Each of the fixing members 104 includes the plate-shaped member 114 and the projecting members 124 provided on the plate-shaped member, and the projecting members 124 function as the supporting points. The projecting members 124 are provided on the surface of each plate-shaped member 114 at the side opposite to the side at which the plate-shaped member 114 is bonded to the rear substrate 12. With this structure, the fixing members 104 are fixed to the supporting body 108, which is a rigid body, with the connecting mechanisms 400 disposed therebetween and accordingly the display panel (vacuum vessel) is fixed to the supporting body 108. The projecting members 124 are strongly connected to each plate-shaped member 114. The connecting method may be, for example, caulking, crimping, welding, or adhesion. The width and area of each plate-shaped member 114 are set such that at least portions of the plate-shaped member 114 on which the projecting members 124 are provided (portions directly under the projecting members 124) have a larger width and area than those of base portions of the projecting members 124 (portions fixed to the plate-shaped member 114). The width and area are set as described above to reduce the stress generated in the vacuum vessel when an impact is applied to the vacuum vessel 10 through the projecting members 124.

The plate-shaped members 114 and the projecting members 124 are preferably formed of a metal, such as aluminum, iron, or magnesium. When the plate-shaped members 114 and the projecting members 124 are formed of a metal, the following advantages can be obtained:

The members can be used as GND members for an electrical circuit or the display panel;

Flame resistance can be ensured; and

Strength can be ensured.

When the plate-shaped members 114 are formed by press working, inexpensive plate-shaped members that have high flatness can be provided. The projecting members 124 can function as interval-regulating members, and may be formed in various shapes, such as the shapes of a column, a rectangular column, or a polygonal column. The projecting members 124 may be formed by, for example, header processing or machining.

The fixing members 104 are arranged on the vacuum vessel 10 such that one of the fixing members 104 is line-symmetrical to the other fixing member 104 about the horizontal center line of the image display area (or the rear substrate 12) of the vacuum vessel 10. In addition, each fixing member 104 has a line-symmetrical shape about the vertical center line of the image display area (or the rear substrate 12) (i.e., a shape obtained by turning over one-half thereof along the center line of the image display area in the short-side direction). Each projecting member 124 had a columnar shape with a diameter of 16 mm. Although an example in which two fixing members are provided is described herein, the number of the fixing members is not limited as long as two or more fixing members 104 are provided. In the case where an odd number of fixing members (for example, three fixing members) are used, one of the fixing members is bonded to the rear substrate 12 such that the fixing member is positioned on the horizontal center line of the image display area of the vacuum vessel 10. The remaining fixing members are bonded to the rear substrate 12 at positions separated from the fixing member on the center line and such that the above-described two positional conditions are satisfied.

The line-shaped fixing members 104 are arranged such that the longitudinal direction thereof is parallel to the longitudinal direction (X-direction in FIG. 8A) of the plate-shaped spacers 14. Therefore, deformation of the spacers and stress concentration (described in detail below) at the positions where the spacers are in contact with the front substrate 11 can be reduced.

The adhesive members 103 with which the fixing members 104 are bonded to the vacuum vessel 10 may be formed of adhesive, double-sided tape, or the like. The material, shape, thickness, area, etc., of the adhesive members 103 are appropriately set in consideration of, for example, the strength, shock absorption, and thermal conductivity of the adhesive members 103 and flatness of the support members. The adhesive members 103 provided on the surface of the vacuum vessel 10 preferably have the same shape as the shape of the fixing members 104. More specifically, the adhesive members 103 are preferably arranged such that the longitudinal direction thereof is parallel to the longitudinal direction of the plate-shaped spacers. The width of the adhesive members 103 may be arbitrarily set. However, to ensure the adhesion area between the vacuum vessel 10 and the fixing members 104, the adhesive members 103 preferably have the same shape as the shape of the orthogonal projections of the fixing members 104 on the surface of the vacuum vessel 10 (on the surface of the rear substrate 12), as illustrated in FIG. 6. As for the adhesive, silicone resin adhesive having elasticity, for example, may be used. As for the double-sided tape, double-sided tape made of an acryl-based material, for example, may be used. In the present example, TSE3944 (produced by Momentive Performance Materials Japan LLC.) is used as the silicone resin adhesive having elasticity. The silicone resin adhesive is applied to the surface of each fixing member 104 that faces the rear substrate 12 over the entire area thereof, and the thickness of the adhesive layer is 1 mm.

The spacers 14 are in contact with the front substrate 11 with a spacer contact layer (described in detail below) interposed therebetween. In this case, there is a possibility that the image display apparatus will be damaged by, for example, an impact that is externally applied to the image display apparatus, an impact applied during transportation or installation, or an impact caused by accidental dropping of the image display apparatus. More specifically, when the above-described impacts are applied, the vacuum vessel 10 is deformed so as to warp concavely or convexly in the depth direction. Owing to this deformation, there has been a risk that components, such as the spacer contact layer, provided on the front substrate 11 at positions where the spacers 14 are provided will receive shearing force generated by the elongate plate-shaped spacers 14 and break. If the components (spacer contact layer) provided on the front substrate 11 at positions where the spacers 14 are provided break, fractions of the components may, for example, fall onto the rear substrate 12. In such a case, undesirable discharge will occur between the metal back layer and the electron-emitting elements or between segments of a segmented metal back layer. As a result, there has been a possibility that the function as the image display apparatus cannot be provided or the display image will be largely degraded.

However, in the display panel according to the present example, the front plate 101 is bonded to the surface of the front substrate 11 and the line-shaped fixing members 104 are arranged so as to extend parallel to the longitudinal direction of the spacers. Therefore, even when the above-described impacts are applied from the supporting body 108 to the vacuum vessel 10 through the fixing members 104, deformation of the spacers 14 and the shearing stress generated at portions (spacer contact layer) that are in contact with the spacers 14 can be reduced. In the display panel according to the present example, the impacts are applied to the vacuum vessel 10 along a plurality of lines that are parallel to the longitudinal direction of the spacers. For example, in the case where the impacts are applied through the fixing members 104, in a sectional view of the vacuum vessel 10 taken along the vertical direction in FIGS. 1A, 1B, and 2, surfaces (vacuum-side surfaces) of the substrates (11 and 12) deform in an irregular shape (in a shape of a sine wave). However, in a sectional view of the vacuum vessel 10 taken along the horizontal direction in FIGS. 1A, 1B, and 2, the deformation of the vacuum vessel 10 (deformations of the front substrate 11 and the rear substrate 12) can be largely reduced compared to that in the cross section taken along the vertical direction. In other words, in the sectional view of the vacuum vessel 10 taken along the horizontal direction, deformation of the spacers 14 in a curved shape (or in a shape of a sine wave) can be reduced. For comparison, the case in which the fixing members 104 are provided so as to extend in a direction perpendicular to the longitudinal direction of the spacers 14 will be considered. In this case, when the impacts are applied, the surfaces of the front substrate 11 and the rear substrate 12 will deform in an irregular shape (in a shape of a sine wave) in a cross section of the vacuum vessel 10 taken along the horizontal direction. At the same time, the spacers receive a force for deforming the spacers in an irregular shape (in a shape of a sine wave) in a cross section of the vacuum vessel 10 taken along the horizontal direction. This occurs because the fixing members 104 are positioned with intervals therebetween (periodically arranged) in the cross section taken along the horizontal direction of the display panel. Therefore, when the impacts are applied from the supporting body 108 to the vacuum vessel 10 through the fixing members (and the adhesive members), the impacts are applied to the sections of the vacuum vessel 10 where the fixing members are bonded, while no impact is applied to the sections where the fixing members are not bonded. As a result, stress concentration areas are generated at periodic positions in sections where the front substrate 11 and the rear substrate 12 are in contact with the spacers 14. In the stress concentration areas, the spacers receive a force that causes the spacers to bend, and therefore the spacers easily break. In addition, as described below, the shearing stress is generated at the portions (spacer contact portions) that are in contact with the spacers, and therefore the spacer contact portions also easily break.

However, in the display panel according to the present example, the line-shaped fixing members 104 are arranged so as to extend parallel to the longitudinal direction of the spacers, so that the above-described stress concentration can be reduced. Therefore, the above-described risk that the function as the image display apparatus cannot be provided or the display image will be largely degraded can be reduced.

Preferably, the adhesive members 103 are line shaped and are arranged such that the longitudinal direction of the adhesive members 103 and the longitudinal direction of the line-shaped fixing members 104 are parallel to the longitudinal direction of the plate-shaped spacers 14. In such a case, the adhesive members 103 appear in the cross section taken along the longitudinal direction of the spacers 14. Therefore, the stress concentration can be further reduced. In addition, from the viewpoint of reducing the stress, the adhesive members 103 and the line-shaped fixing members 104 are preferably provided on the rear substrate 12 at positions directly behind the spacers 14.

Referring to FIGS. 6 and 7, each fixing member includes the large-width portions 114a and the small-width portions 114b that are alternately arranged and that are continuous to each other. Here, the "width" of the "large-width portions" and the "small-width portions" corresponds to the dimension in the vertical direction (direction perpendicular to the longitudinal direction of the spacers). The projecting members 124 are provided on the large-width portions 114a because when the dropping impact or the like is applied to the vacuum vessel 10 through the projecting members 124, the stress can be dissipated along the large-width portions 114a and the impact applied to the vacuum vessel 10 can be reduced. The area, shape, and thickness of the large-width portions 114a, that is, portions with a large area, are appropriately determined on the basis of, for example, the rigidity of the vacuum vessel 10 and expected dropping impact. In addition, the pitch and the number of the projecting members 124 are also appropriately determined on the basis of, for example, the rigidity of the vacuum vessel 10, allowable dropping impact. The pitch of the projecting members 124 (interval between the projecting members 124) in the vertical direction (direction perpendicular to the longitudinal direction of the spacers) is larger than the pitch of the projecting members 124 (intervals between the projecting members 124) in the horizontal direction (direction parallel to the longitudinal direction of the spacers). In practice, the pitch of the projecting members 124 in the horizontal direction is set to be smaller than one-half of the pitch of the projecting members 124 in the vertical direction. The pitch of the projecting members 124 in the vertical direction is equivalent to the pitch of the two adjacent fixing members (interval between the two adjacent fixing members) among the fixing members 104 bonded to the rear substrate 12. In the case where the pitches are set as described above, when the impact is applied to the vacuum vessel 10 through the projecting members, the stress can be reduced along the longitudinal direction of the spacers 14 and deformation of the vacuum vessel can be reduced. Therefore, breakage of the vacuum vessel 10 can be suppressed. If the pitch of the projecting members 124 (intervals between the projecting members 124) in the vertical direction is smaller than the pitch of the projecting members 124 (intervals between the projecting members 124) in the horizontal direction, the stress cannot be reduced along the longitudinal direction of the spacers 14.

Next, the spacer contact layer will be described.

The spacers 14 are in contact with a component (for example, a resistance layer (not shown) or the metal back layer 20) provided on the front substrate 11. The component that is provided on the front substrate 11 and that comes into contact with the spacers 14 is called the spacer contact layer. Accordingly, the metal back layer 20 may be regarded as the spacer contact layer. The spacer contact layer may be formed by, for example, printing and baking a paste containing silver particles. Conductive particles, such as Pt and Au particles may be used in place of silver particles. The spacer contact layer may include portions that are intermittently arranged with intervals therebetween in the longitudinal direction of the spacers. From the viewpoint of contact performance between the spacer contact layer and the spacers and antistatic performance, the spacer contact layer is preferably conductive. However, an insulating spacer contact layer may also be used.

Next, the shape of each connecting mechanism 400 will be described with reference FIGS. 6 and 7. Each connecting mechanism 400 includes a first connecting member 405 and a second connecting member 406, and the relative position between the first connecting member 405 and the second connecting member 406 can be adjusted by the relative-position adjusting portions 107 having a structure similar to that illustrated in FIGS. 1A, 1B, and 2. Each first connecting member 405 includes a flat plate portion 415 and a plurality of bent portions 425. Each first connecting member 405 is formed by molding a zinc coated steel plate (provided with projecting portions that serve as the bent portions 425 along either side thereof) having a thickness of 1 mm, a length in the longitudinal direction (horizontal direction in FIGS. 6 and 7) of 1020 mm, and a dimension in the width direction (vertical direction in FIGS. 6 and 7) of 36 mm. The bent portions 425 are formed by bending the zinc coated steel plate such that the cross section of the first connecting member 405 along the vertical direction has an angular U-shape at positions corresponding to the projecting members 124 on the corresponding fixing member 104.

More specifically, in the present example, a plurality of angular U-shaped portions are arranged at the same pitch as the pitch of the projecting members 124 in the horizontal direction, and flat-plate-shaped portions are provided between the angular U-shaped portions. The angular U-shaped portions are portions which each include a pair of bent portions 425 that face each other in the vertical direction and a portion of the flat plate portion 415 that connect the pair of bent portions 425 to each other. In addition, the above-described flat-plate-shaped portions are portions of the flat plate portion 415 positioned between the angular U-shaped portions. Thus, each first connecting member 405 includes a plurality of angular U-shaped portions and a plurality of flat-plate-shaped portions.

Each bent portion 425 has a rectangular shape. The dimension of each bent portion 425 in the horizontal direction is 20 mm, and the bending height (dimension in the depth direction) thereof is 12 mm. FIG. 6 illustrates an example in which twelve bent portions 425 (six pairs of bent portions that face each other in the vertical direction) are provided on each first connecting member 405 along the horizontal direction (longitudinal direction of the first connecting member 405). At least four bent portions 425 (two pairs of bent portions 425 that face each other in the vertical direction) are provided depending on, for example, the size of the vacuum vessel 10. Similar to the structure illustrated in FIG. 2, long circular holes (elliptical holes) 125a with the size of 4.5 mm×5.5 mm, which serve as parts of the adjusting portions 107, are formed in the bent portions 425 at central positions thereof such that the long axes of the long circular holes 125a extend in the depth direction. In each first connecting member 405, the bent portions 425 and the long circular holes 125a are arranged at the same pitch (200 mm) as the pitch of the projecting members 124 on each fixing member 104 in the horizontal direction.

Each second connecting member 406 is formed by molding a zinc coated steel plate having a thickness of 3.2 mm, a length in the longitudinal direction (horizontal direction in FIGS. 6 and 7) of 1020 mm, and a dimension in the width direction (vertical direction in FIGS. 6 and 7) of 38 mm. Each second connecting member 406 includes a flat plate portion 416 and bent portions 426. Each bent portions 426 are formed by bending the zinc coated steel plate such that the cross section of the second connecting member 406 along the vertical direction has an angular U-shape at any position. The height (dimension in the depth direction) of the bent portions 426 is 14 mm, and internal thread portions 106a similar to those illustrated in FIG. 2, which serve as parts of the adjusting portions 107, are formed in the bent portions 426. Similar to the first connecting members 405, the internal thread portion 106a, which serve as parts of the adjusting portions 107, are arranged at the same pitch (200 mm) as the pitch of the projecting members 124 on the fixing members 104 in the horizontal direction. The bent portions 426 of each second connecting member 406 and the bent portions 425 of the corresponding first connecting member 405 are provided so as to overlap in the vertical direction. Therefore, the flat plate portion 415 of each first connecting member 405 and the flat plate portion 416 of the corresponding second connecting member 406 face each other.

The adjusting portions 107 have the same shape as those in FIG. 2. Therefore, the adjusting portions 107 will be described with reference to FIG. 2. The long circular holes 125a are formed in the bent portions 425 (125 in FIG. 2) of each first connecting member 405 (105 in FIG. 2). The internal thread portion 106a are formed in the bent portions 426 of each second connecting member 406 (106 in FIG. 2). The screws 117 are inserted through the long circular holes 125a and are screwed into the internal thread portions 106a while the first connecting member 405 and the second connecting member 406 are fitted together (while the bent portions 425 and the bent portions 426 overlap). Accordingly, the relative position between the first connecting member 405 and the second connecting member 406 is fixed. The relative position between the first connecting member 405 and the second connecting member 406 is adjusted (in the depth direction) by adjusting the relative positions between the internal thread portions 106a and the long circular holes 125a.

Next, the flexural rigidities of the first connecting members 405 and the display panel 100 will be described. Each first connecting member 405 is fixed to the projecting members 124 provided on the corresponding fixing member 104, which is a part of the display panel 100, at a pitch of 200 mm. More specifically, the angular U-shaped portions of each first connecting member 405 are fixed to the projecting members 124 on the corresponding fixing member 104. Therefore, flat plates (flat-plate-shaped portions positioned between the portions that are angular U-shaped in cross section) having a thickness of 1 mm is provided between each first connecting member 405 and fixing points of the display panel 100. The flexural rigidity of the first connecting members 405 can be calculated as $6.2 \times 10^6$ N·mm$^2$ from the second moment of inertia (30 mm$^4$) and the Young's modulus (206 kN/mm$^2$) of a 1 mm thick flat plate in the horizontal direction. The flexural rigidity of the second connecting members 406 is, of course, higher than that of the first connecting members 405.

The flexural rigidity of the display panel 100 can be calculated as $2.8 \times 10^8$ N·mm$^2$ by structural analysis.

In the present example, it can be assumed that the connection points between each first connecting member 405 and the display panel 100 are arranged at a pitch of 200 mm. Therefore, the flexural rigidity of portions between the connection points of each fixing member 104 and the corresponding first connecting member 405 is determined. In the structural analysis, it is assumed that one end of each portion between the connection points is a fixed end and the load is applied at the other end. The flexural rigidity can be determined on the basis of the calculated relationship between the load and deflection. When the above-described value of flexural rigidity of each first connecting member 405 and the above-described value of flexural rigidity of the display panel 100 are compared with each other, the flexural rigidity of each first connecting member 405 is smaller than the flexural rigidity of the display panel 100 by a factor of about 45. In practice (when, for example, life is assumed to be about 10 years), the flexural rigidity of each first connecting member 405 may be smaller than or equal to a value smaller than the flexural rigidity of the display panel 100 by a factor of 20.

When the first connecting members 405 are fixed to the display panel 100 with the projecting members 124 on the fixing members 104 disposed therebetween, there is a possibility that the display panel 100 will deform in the depth direction. Such a deformation is caused by, for example, warping of the vacuum vessel 10 caused in the manufacturing process thereof, dimensional tolerance of the fixing members 104, assembly tolerance in the process of attaching the fixing members 104 to the vacuum vessel 10, and differences in flatness between the first connecting members 405. However, since the flexural rigidity of the first connecting members 405 is lower than that of the display panel as described above, the deformation mainly occurs in the first connecting members 405. Accordingly, deformation of the display panel 100 in the depth direction can be reduced. Therefore, according to the present example, no cracks were found in the vacuum vessel 10 for a long time. For comparison, an image display apparatus was manufactured in which the flexural rigidity of the first connecting members 405 is set to about ten times as large as the flexural rigidity of the display panel 100, unlike the present example. In this image display apparatus, the display panel 100 deformed in the depth direction and the stress was generated for a long time. As a result, cracks were generated in portions of the rear substrate 12, which is formed of a glass substrate, of the vacuum vessel 10.

In addition, owing to the adjusting portions 107 according to the present example, when the display panel 100 is fixed to the supporting body 108, deformation of the display panel in the depth direction caused by variation in the flatness of the supporting body 108 can also be reduced. In addition, the problems of the related art described in NPL 1 can be solved. More specifically, the positioning performance for positioning the display panel can be increased and the reaction force applied to the display panel due to deformation of the elastic components can be reduced.

As described above, according to the present invention, the deformation of the display panel 100 in the depth direction can be reduced, and the display panel 100 can be accurately positioned and stably supported. As a result, the image display apparatus having long-term reliability can be provided.

An image display apparatus that prevents stress from being generated in a display panel for a long time, that has high positioning performance for positioning the display panel, and that stably supports the display panel can be provided.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of International Application No. PCT/JP2009/069996, filed Nov. 27, 2009, which is hereby incorporated by reference herein in its entirety.

What is claimed is:

1. An image display apparatus comprising:
   a display panel and a connecting mechanism for connecting the display panel to a supporting body that supports the display panel,
   wherein the connecting mechanism includes a plurality of first connecting members fixed to a back surface of the display panel at the side opposite to an image display surface of the display panel, a plurality of second connecting members that connect the supporting body for supporting the display panel to the first connecting members, and a relative-position adjusting portion that adjusts relative positions between the first connecting members and the second connecting members,
   wherein the relative-position adjusting portion includes a slider portion provided at one of each first connecting member and the corresponding second connecting member and a rail portion provided at the other one of each first connecting member and the corresponding second connecting member, the slider portion including a steel ball and a spring and the rail portion regulating a movement of the steel ball,
   wherein the steel ball is pressed against the rail portion by the spring so that a frictional force is generated between the rail portion and the steel ball, and the relative positions between the first connecting members and the second connecting members are fixed by the generated frictional force, and
   wherein a flexural rigidity of the first connecting members is lower than a flexural rigidity of the display panel.

2. The image display apparatus according to claim 1, wherein a flexural rigidity of the second connecting members is higher than the flexural rigidity of the display panel.

3. The image display apparatus according to claim 1, wherein a longitudinal direction of the first connecting members and a longitudinal direction of the second connecting members extend along a longitudinal direction of the display panel,
- wherein each of the first connecting members and the second connecting members includes a flat plate portion and a bent portion, and
- wherein the first connecting members and the second connecting members are fitted together such that the bent portions of the first connecting members overlap the bent portions of the second connecting members.

4. The image display apparatus according to claim 3, wherein the relative-position adjusting portion includes an internal thread portion provided in one of the bent portion of each first connecting member and the bent portion of the corresponding second connecting member, a long circular hole provided in the other one of the bent portion of each first connecting member and the bent portion of the corresponding second connecting member, and a screw having a screw diameter such that the screw can be screwed into the internal thread portion.

5. The image display apparatus according to claim 1, wherein the rail portion includes a part of an inner wall of a hole formed in the other one of each first connecting member and the corresponding second connecting member.

6. An image display apparatus comprising:
- a display panel and a connecting mechanism for connecting the display panel to a supporting body that supports the display panel,
- wherein the connecting mechanism includes a plurality of first connecting members fixed to a back surface of the display panel at the side opposite to an image display surface of the display panel, a plurality of second connecting members that connect the supporting body for supporting the display panel to the first connecting members, and a relative-position adjusting portion that adjusts relative positions between the first connecting members and the second connecting members,
- wherein a flexural rigidity of the first connecting members is lower than a flexural rigidity of the display panel,
- wherein the display panel at least includes,
  - a vacuum vessel including a front substrate to which a front plate is bonded, a rear substrate including a surface that faces the front substrate, and a plurality of plate-shaped spacers disposed between the front substrate and the rear substrate such that longitudinal directions of the spacers are parallel to each other, and
  - a plurality of line-shaped fixing members bonded to a surface of the rear substrate at the side opposite to the surface that faces the front substrate,
- wherein the line-shaped fixing members are bonded with predetermined intervals therebetween to the rear substrate such that the line-shaped fixing members extend along the longitudinal directions of the spacers,
- wherein the first connecting members are fixed to the line-shaped fixing members,
- wherein each of the fixing members includes a plate-shaped member that is bonded to the surface at the side opposite to the surface that faces the front substrate and a plurality of projecting members provided on a surface of the plate-shaped member at the side opposite to the rear substrate,
- wherein the first connecting members are fixed to the projecting members of the fixing members,
- wherein the plate-shaped member includes a plurality of large-width portions and a plurality of small-width portions that are alternately arranged along the longitudinal directions of the spacers, and
- wherein the projecting members are provided on the large-width portions.

* * * * *